United States Patent [19]
Campbell et al.

[11] Patent Number: 5,561,907
[45] Date of Patent: Oct. 8, 1996

[54] ALGNING MECHANISM FOR HAND-HELD POWER SAW

[75] Inventors: David C. Campbell, Bel Air; Paul G. Gross, Towson; Gale A. Heslop, Carney, all of Md.

[73] Assignee: Black & Decker Inc., Newark, Del.

[21] Appl. No.: 532,192

[22] Filed: Sep. 22, 1995

[51] Int. Cl.⁶ ............................................. B27B 9/04
[52] U.S. Cl. ................................. 30/371; 30/388
[58] Field of Search ............... 30/371, 372, 378, 30/375, 376, 388, 390; 83/574, 745, 582, 821

[56] References Cited

U.S. PATENT DOCUMENTS

| | | | |
|---|---|---|---|
| 2,819,742 | 1/1958 | Blachly | 30/376 |
| 3,045,724 | 7/1962 | Mitchell | 30/372 |
| 4,078,309 | 3/1978 | Wilson | 30/375 |
| 4,453,312 | 6/1984 | Nishioka | 30/372 |
| 4,602,435 | 7/1986 | Nishioka | 30/372 |
| 4,730,396 | 3/1988 | Nishioka | 30/371 |
| 4,790,072 | 12/1988 | Edwards | 30/376 |
| 5,084,977 | 2/1992 | Perkins | 30/374 |
| 5,099,580 | 3/1992 | Stegall et al. | 30/383 |
| 5,481,806 | 1/1996 | Pratt | 30/391 |

FOREIGN PATENT DOCUMENTS

| | | |
|---|---|---|
| 34 24 750.5 | 1/1986 | Germany . |
| 34 26 336.5 | 1/1986 | Germany . |
| 8517524 | 11/1986 | Germany . |
| 3520309 | 12/1986 | Germany . |

*Primary Examiner*—Hwei-Siu Payer
*Attorney, Agent, or Firm*—Shook, Hardy & Bacon L.L.P.

[57] ABSTRACT

An aligning mechanism for a hand-held circular saw has a base adapted to be attached to the circular saw. The base has an upper surface and a lower surface. At least two paddles are pivotally mounted about a horizontal axis and movable in unison between a deployed position and an undeployed position. Each paddle when in its deployed position extends below the lower surface of the base and is capable of contacting an edge of the workpiece so that the saw blade is aligned in a predetermined position with respect to the edge. The paddles move in unison toward their undeployed positions as the saw blade engages the workpiece while maintaining the predetermined alignment between the saw blade and the edge.

36 Claims, 9 Drawing Sheets

ALGNING MECHANISM FOR HAND-HELD POWER SAW

BACKGROUND OF THE INVENTION

This invention relates to a mechanism for aligning a hand-held power saw, and, more particularly, to a mechanism that allows the saw blade to be aligned at a predetermined position with respect to the edge of the workpiece.

Users of hand-held power saws, and particularly hand-held circular saws, typically have great difficulties aligning the saw blade with the desired cutline on the workpiece. More specifically, most saw users often make cuts that are generally at 90 degrees with respect to a straight edge of the workpiece. Therefore, users often draw or mark a line on the workpiece to indicate the path upon which the blade should pass to obtain a perpendicular cut.

In the past, to begin the cut along the desired cutline, the user would first attempt to align the blade with the line by positioning a guide slot (formed in the planar cutting base of the saw) at the beginning of the line. Because the user had no means to "square" the cutting blade with respect to the workpiece edge, oftentimes the initial cut of the blade was not properly aligned. Once the blade was started in a direction that was divergent from the desired cutline, it was often difficult to correct the direction of the blade. Further, even if the blade could be corrected, the end result was a cut edge that was not planar but which may have had numerous undulations resulting from the blade corrections.

Attempts have been made to provide attachments that allow the saw blade of a circular saw to be squared with the workpiece edge. Most of these aligning structures are very bulky, expensive, cumbersome, and greatly increase the weight of the saw. One such structure is disclosed in U.S. Pat. No. 3,045,724. As is apparent, such a structure greatly impairs the user's ability to position the circular saw in tight surroundings.

An additional type of alignment mechanism is shown in U.S. Pat. No. 4,730,396. This patent discloses one arm pivotally mounted to and extending below the base of a circular saw. A spring urges the arm to an operable position below the saw base. In order to align the saw blade, an operator moves the saw forwardly such that both the saw blade and the arm contact the edge of the workpiece. As the saw is moved further forward, the arm pivots in a rearwardly direction and retracts from its operable position below the bottom of the saw base to a nonoperable position above the bottom of the base.

The aligning mechanism disclosed in this patent is disadvantageous for a number of reasons. First, the alignment system oftentimes results in inaccurate alignment. More specifically, one of the two spaced points that contact the edge of the workpiece is the saw blade. The blade has an uneven periphery in that it presents the peaks and valleys associated with the cutting teeth. Therefore, the alignment of the blade can vary depending upon whether a peak or a valley contacts the workpiece edge. Furthermore, different types of blades can have different tooth configurations and different diameters. As is apparent, the variability in tooth configurations and diameters will also result in inaccurate alignment. A further disadvantage of the saw blade acting as one of the contact points for the edge is that the blade will often mar the edge during the aligning procedure. Thus, the alignment mechanism of the above patent may result in damage to the workpiece.

Therefore, an alignment mechanism is needed which will overcome the problems with the prior art aligning mechanisms discussed above.

SUMMARY OF THE INVENTION

Accordingly, it is an object of the present invention to provide an aligning mechanism for a hand-held power saw which allows accurate, consistent alignment of the saw blade regardless of the tooth configuration or diameter of the blade.

Another object of this invention is to provide an aligning mechanism which allows the saw blade to be positioned in a predetermined alignment with respect to the edge of a workpiece and which is lightweight, easily manufactured, economical and does not increase the overall bulk of the saw.

A further object of this invention is to provide an alignment mechanism which will not mar or damage the edge of the workpiece.

Accordingly, the present invention provides for an aligning mechanism including a base attached to the motor and saw blade assembly of a circular saw. The base has an upper surface and a lower surface. The mechanism includes at least two paddles pivotally mounted about a horizontal axis and movable in unison between a deployed position and an undeployed position. Each paddle in its undeployed position is disposed above the lower surface of the base, and in its deployed position extends below the lower surface of the base. Each paddle is also capable of contacting an edge of the workpiece so that the saw blade is aligned in a predetermined position with respect to the edge. The paddles move in unison toward their undeployed positions as the saw blade engages the workpiece while maintaining the predetermined alignment between the saw blade and the edge.

Additional objects, advantages and novel features of the invention will be set forth in part in a description which follows, and in part will become apparent to those skilled in the art upon examination of the following, or may be learned by practice of the invention.

BRIEF DESCRIPTION OF THE DRAWINGS

In the accompanying drawings which form a part of this specification and are to be read in conjunction therewith and in which like reference numerals are used to indicate like parts in the various views.

DETAILED DESCRIPTION OF THE PREFERRED EMBODIMENTS

Figure 1:
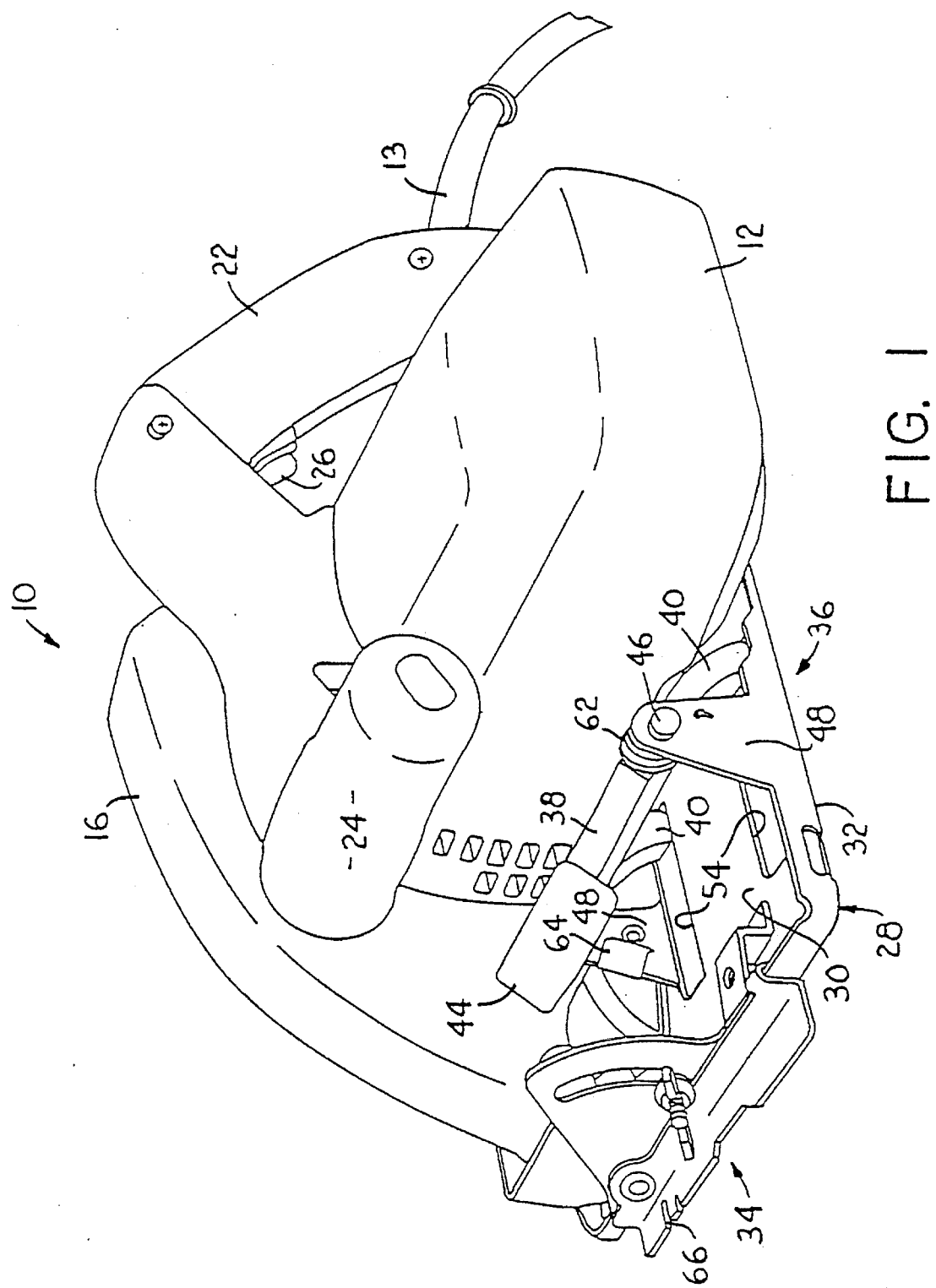
FIG. 1 is a top perspective view of a circular saw with an aligning mechanism embodying the principles of this invention, the mechanism shown in its undeployed position.
Figure 5:
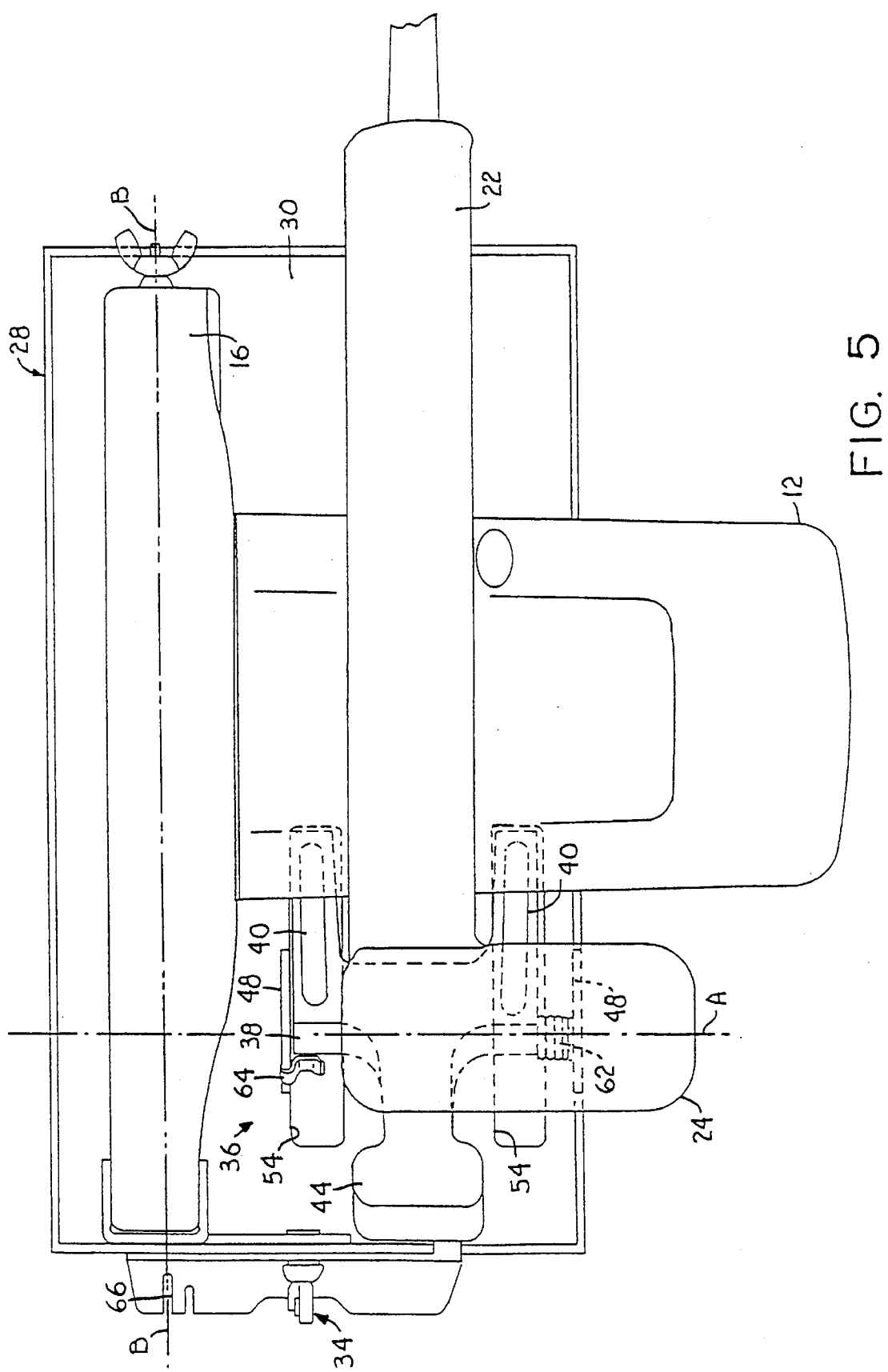
FIG. 5 is a top plan view of the circular saw of FIG. 1 with the aligning mechanism in its undeployed position.
Figure 6:
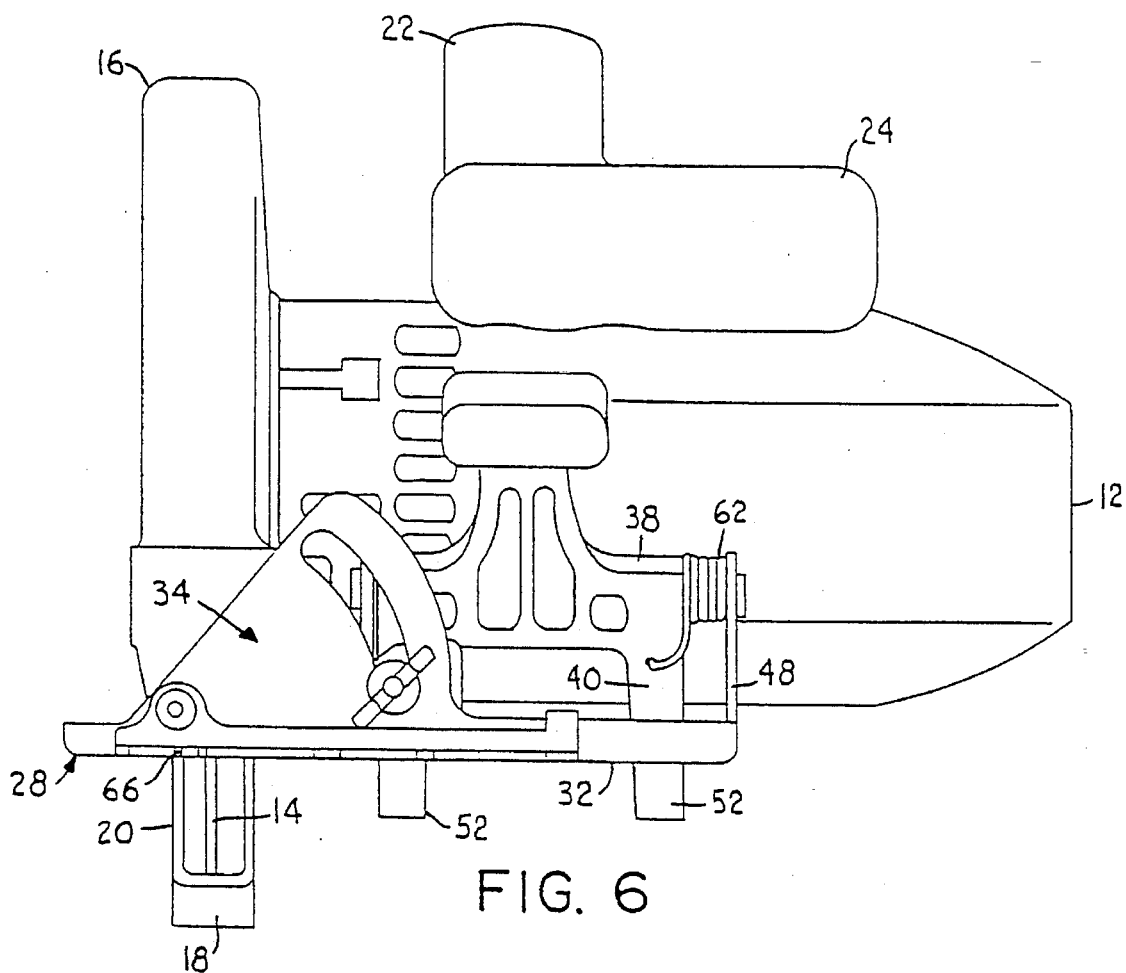
FIG. 6 is a front elevational view of the circular saw of FIG. 1 with the aligning mechanism in a partially deployed position.

Referring to the drawings in greater detail, and initially to FIGS. 1, 5 and 6, a power circular saw designated generally by the numeral 10 is shown. Saw 10 has a motor assembly 12 to which is operably attached a rotating circular saw blade 14. A power cord 13 supplies electrical power to motor 12. Blade 14 is generally surrounded by an upper stationary guard 16 and a lower movable guard 18. Guard 16 is fixably secured to motor 12. Guard 18 exposes the lower portion of blade 14 in a manner that is well-known in the art. More specifically, the front edge 20 of guard 18 engages the leading edge of the workpiece. As the saw passes further into the workpiece, guard 18 is rotated generally upwardly to expose the lower portion of the blade. Guard 18 is spring-loaded so that when the saw is disengaged from the workpiece, guard 18 returns to its lower covering position.

Figure 2:
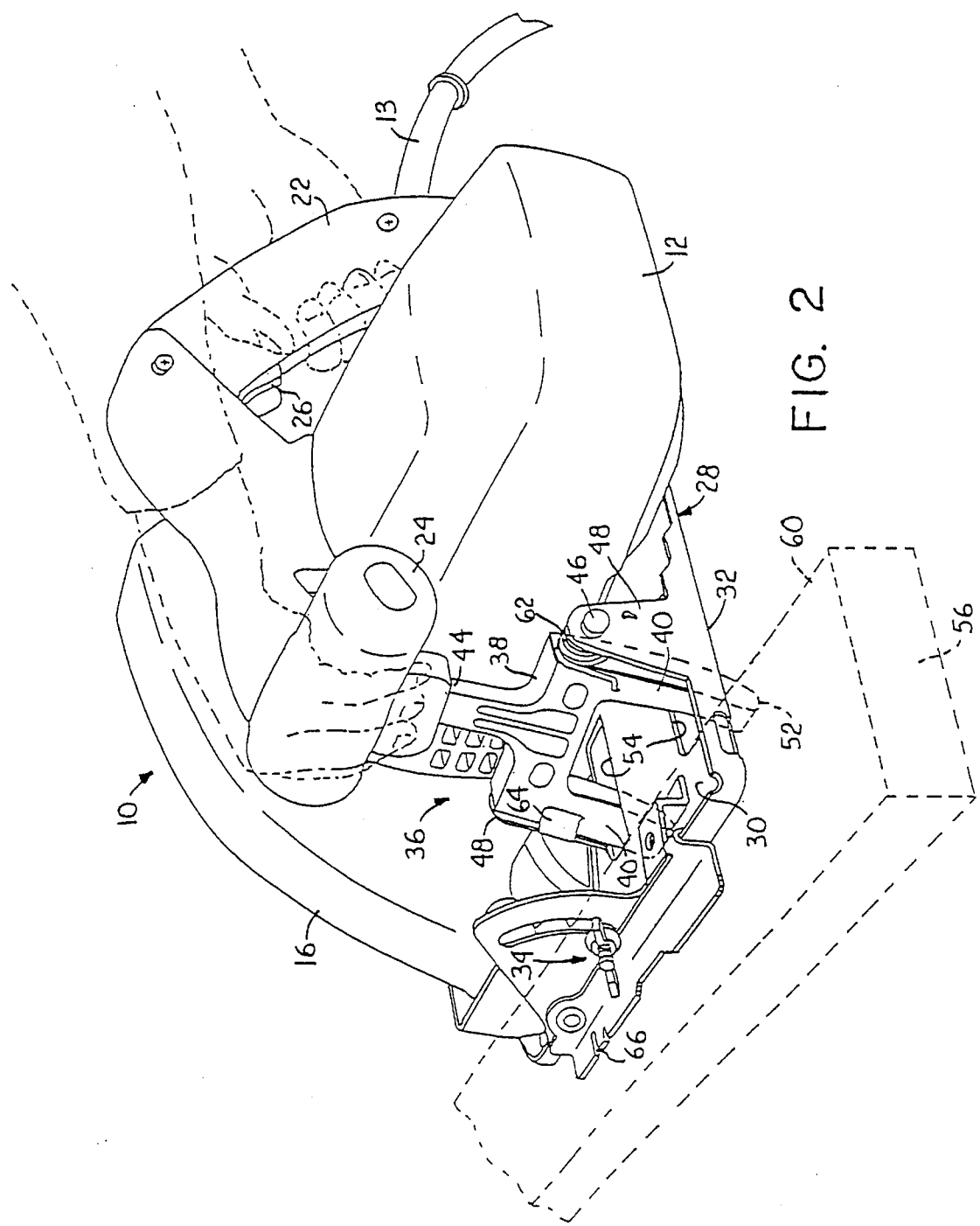
FIG. 2 is a view similar to FIG. 1 showing the aligning mechanism in its deployed position contacting the workpiece (shown in broken lines) to align the saw blade perpendicular to the workpiece, the positioning of the user's hands and fingers shown in phantom lines.
Figure 3:
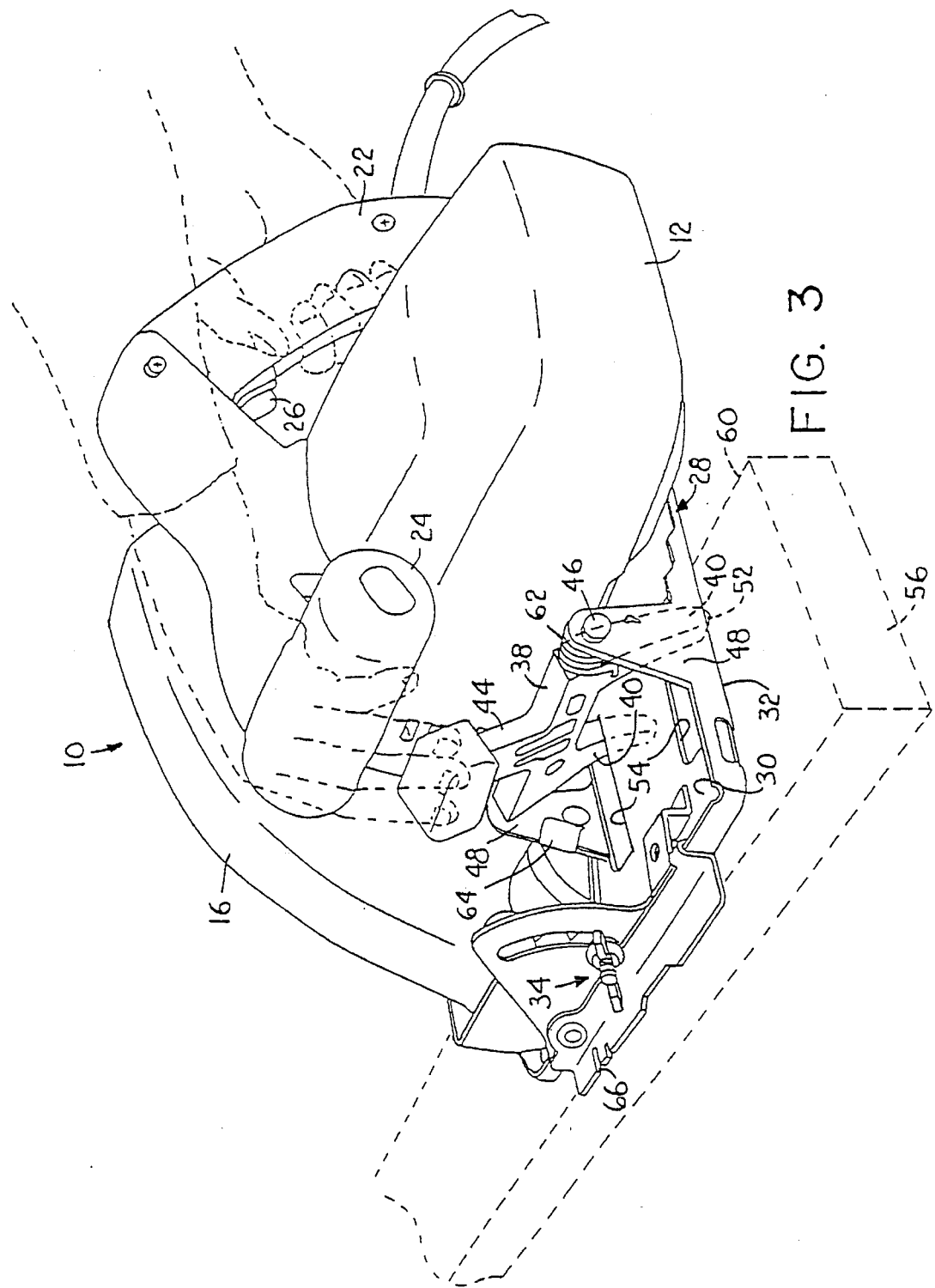
FIG. 3 is a view similar to FIG. 2 showing the aligning mechanism at an intermediate position after the saw blade has engaged the workpiece and showing the positioning of the user's hands and fingers at this intermediate position.

Saw 10 further includes a rear trigger handle 22 and a forward brace handle 24. Trigger handle 22 has a switch 26 mounted thereon for operation by one hand of a saw user, as best shown in FIGS. 2 and 3. The other hand of the saw user is positioned on brace handle 24 which allows the user to control the saw as it passes through a workpiece.

A generally planar base or shoe 28 is attached to stationary guard 16. Base 28 has an upper planar surface 30 and a lower planar surface 32. Lower surface 32 rests on the upper surface of the workpiece as the saw passes therethrough and is used to gauge the depth to which blade 14 cuts. Blade 14 and movable guard 18 are positioned through an elongated opening (not shown) formed in base 28 so that blade 14 and guard 18 can be positioned below lower surface 32 to engage a workpiece. Base 28 is usually adjustable so that the portion of blade 14 extending below lower surface 32 can be varied to adjust the cutting depth of the blade. Further, base 28 has angle-adjusting mechanism 34 which allows the angle of blade 14 to be adjusted from a perpendicular position to various angular positions with respect to the planar surface of base 28.

The heretofore described components and operation of saw 10 are conventional and well-known to those skilled in the art. An aligning mechanism embodying the principles of this invention is broadly designated in the drawings by the reference numeral 36. Mechanism 36 includes a U-shaped aligning member 38. Member 38 includes two downwardly extending substantially rigid paddles 40. Member 38 further includes an upwardly extending finger lever 44 which is capable of being actuated by the fingers of the saw user in a manner that will be further described below. A pair of mounting pins 46 extend from opposite sides of member 38 and can be formed integrally therewith. Pins 46 serve to pivotally mount member 38 to mounting posts 48 extending upwardly from upper surface 30 of base 28. Each post 48 has an aperture 50 in which the respective pin 46 is disposed.

Figure 4A:
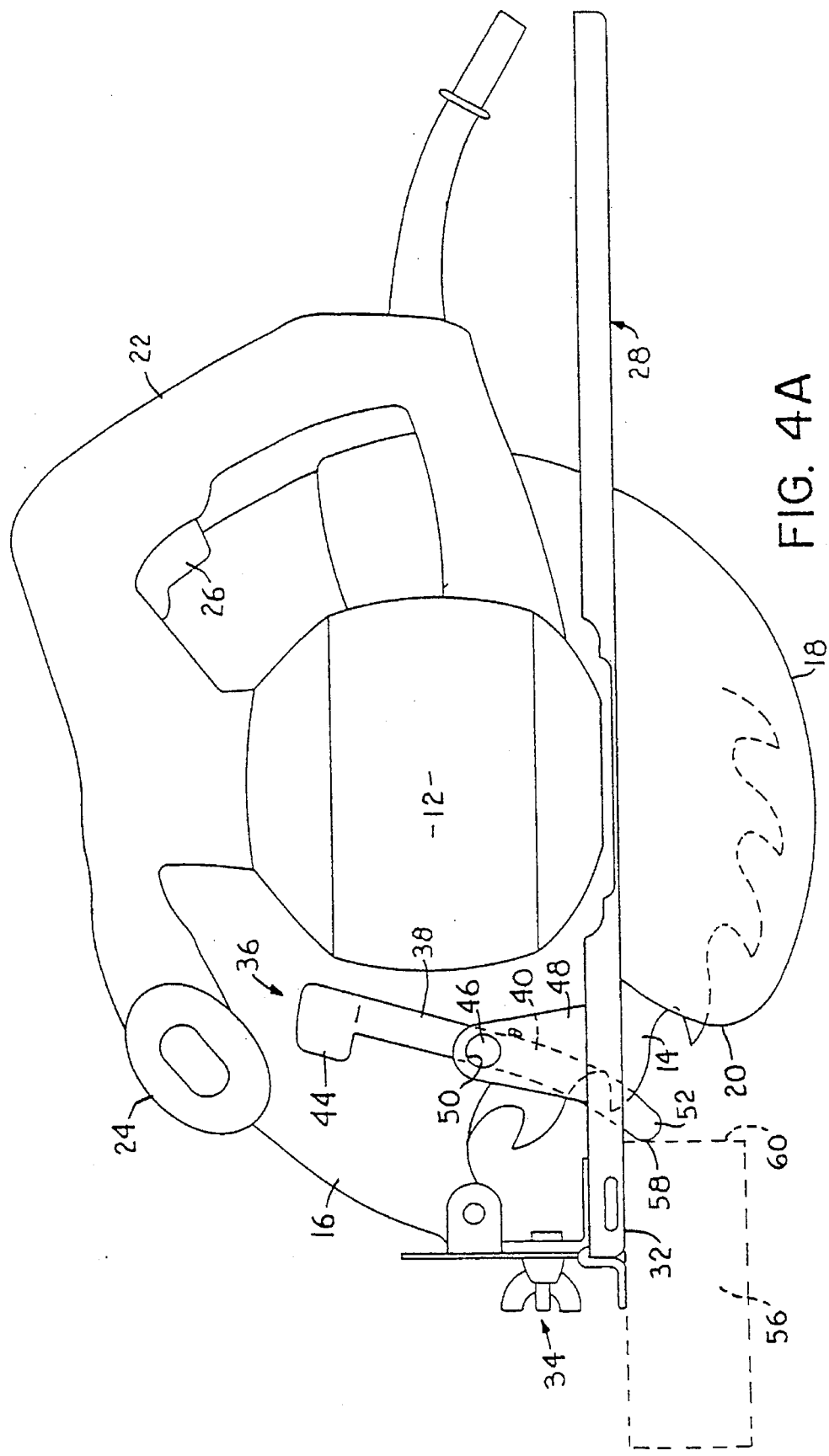
FIG. 4A is a side elevational view of the circular saw of FIG. 1 showing the aligning mechanism in its deployed position contacting the edge of the workpiece.

Member 38 and, thus, paddles 40, are pivotally movable between a deployed position, as shown in FIGS. 2 and 4A, and an undeployed position as shown in FIGS. 1 and 5. When paddles 40 are in their deployed positions, the lower ends 52 of the paddles extend below lower surface 32 of base 28. Paddles 40 are able to extend below surface 32 by the provision of the pair of elongated slots 54 formed in base 28. Each paddle 40 is aligned with and capable of passing through its respective slot 54. In their deployed positions, ends 52 of paddles 40 are capable of engaging a workpiece 56 at two separate points of engagement 58. Specifically, each paddle 40 will contact an edge 60 of workpiece 56 when the paddles are in their deployed positions, as best shown in FIG. 4A. This contact by both paddles 40 provides the alignment of blade 14 with respect to edge 60 as will be further described below.

When paddles 40 are in their undeployed positions, ends 52 of the paddles are positioned above lower surface 32 of base 28, as shown in FIGS. 1 and 5. Therefore, when paddles 40 are in their undeployed position, they will not engage the workpiece.

A torsion spring 62 is preferably attached between one of posts 48 and one of paddles 40 and is used to bias member 38 and, thus, paddles 40 to their undeployed positions. More specifically, without any actuation by a saw user, paddles 40 will remain in their undeployed positions.

With reference to FIG. 5, member 38 is pivotally mounted about horizontal axis A which is substantially perpendicular to the cutting path B of blade 14. Therefore, mechanism 36 can be used to align blade 14 substantially perpendicular to the edge of a workpiece as will be described below.

In operation, prior to positioning the front of base 28 on the top of workpiece 56, the user actuates lever 44 to pivot paddles 40 into their deployed positions, as best shown in FIGS. 2 and 4A. More specifically, a saw user utilizes the fingers of the hand positioned on brace handle 24 to engage the front surface of lever 44 and, thus, rotate member 38 in a clockwise direction until one of paddles 40 engages a stop 64 positioned on one of posts 48. The engagement of one of the paddles 40 with stop 64 corresponds to the fully deployed positions of paddles 40. The forwardmost portion of base 28 is then rested on the top surface of workpiece 56 adjacent edge 60 as shown in FIG. 4A. Lower ends 52 of paddles 40 are then brought into engagement at points 58 with edge 60 so that member 38 is engaging edge 60 at two separate distinct points. This engagement at two points by the pair of paddles 40 allows blade 14 to be aligned generally perpendicular to edge 60 of workpiece 56. More specifically, as discussed above, member 38 is pivotally mounted on a horizontal axis that is substantially perpendicular to the cutting path of blade 14. Thus, when paddles 40 engage edge 60 of the workpiece, the blade will be aligned substantially perpendicular to the edge. When paddles 40 are in their fully deployed positions, the forwardmost portion of ends 52 of the paddles are at a longitudinal location that is in front of the initial cutting edge of the blade. More specifically, blade 14 will begin to cut the workpiece where the blade intersects base 28. Ends 52 of paddles 40 are forward of this intersection as shown in FIG. 4A.

After paddles 40 are in their deployed positions and are engaging edge 60, the saw user can slide the saw along edge 60 until the cutline alignment guide 66 is aligned with the desired cutline on the workpiece. Saw blade 14 is then at the desired cut location and is substantially perpendicular to edge 60. The user actuates switch 26 to begin the cutting rotation of blade 14. As the user moves the blade closer to workpiece 56, contact between paddles 40 and edge 60 is maintained. Further, the user maintains some pressure on lever 44 as the saw is moved forwardly and as paddles 40 are allowed to rotate to their undeployed positions as shown in FIGS. 3 and 4B.

Figure 4B:
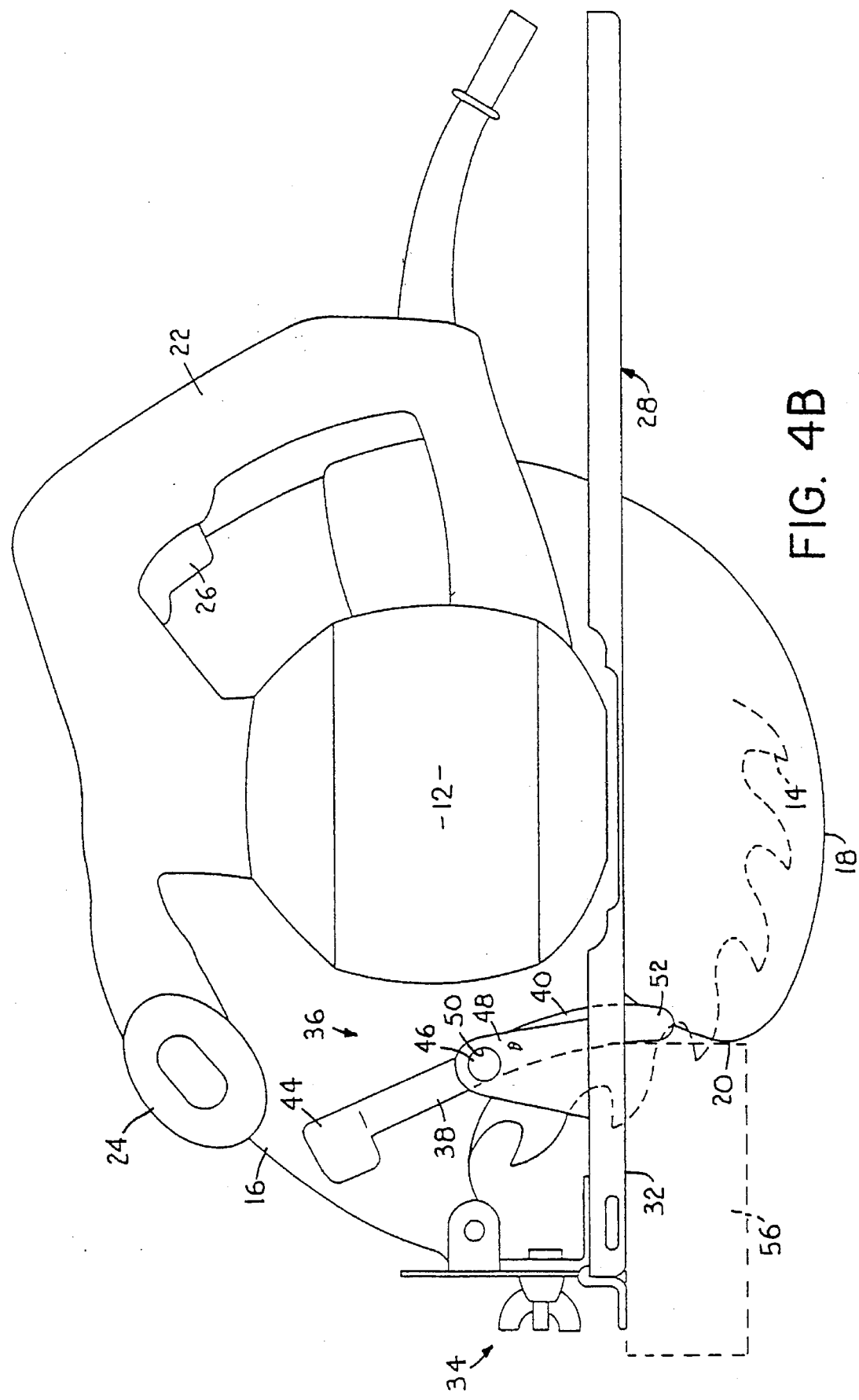
FIG. 4B is a view similar to FIG. 4A showing the aligning mechanism at an intermediate position where the saw blade has partially cut into the workpiece.

Mechanism 36 maintains the perpendicular alignment of blade 14 with respect to edge 60 even after the blade engages the workpiece as shown in FIGS. 3 and 4B. More specifically, ends 52 of paddles 40 will continue to engage edge 60 as the saw is moved through workpiece 56 until the paddles reach their undeployed positions. The saw user continues to maintain pressure on lever 44 in response to the movement of the saw through the workpiece and the counterclockwise rotation of the paddles. Thus, the saw user can sense and maintain the perpendicular orientation prior to and during the initial cutting stages of the blade. Further, the user can utilize finger lever 44 to ease the blade into its initial cut to minimize the initial trauma on the workpiece that often results from abrupt engagement of the blade with the workpiece.

After the paddles have reached their undeployed positions, they do not interfere with the continued cutting through the workpiece. After the saw is disengaged from the workpiece, the paddles remain in their undeployed positions until actuated to their deployed positions by the user.

Although mechanism 36 has been described above as allowing alignment of blade 14 so that it is substantially perpendicular to edge 60 of workpiece 56, mechanism 36 could also be constructed so that it allows blade 14 to be positioned at other predetermined angles with respect to edge 60.

Therefore, as is apparent from the above discussion, aligning mechanism 36 allows a saw user to align the blade of the saw substantially perpendicular with respect to the edge of a workpiece in a consistent, easily operated manner, without damaging the workpiece. Because mechanism 36 has the two separate spaced contact points of paddles 40, and does not utilize the blade as one of the contact points, the alignment of the blade will be consistent every time no matter the diameter or the particular tooth configuration of the blade. Therefore, the possibility of having an inaccurate alignment because one of the aligning points is the saw blade is avoided. Further, again because the saw blade is not used as one of the aligning points, marring of the edge of the workpiece can be avoided. The engagement of paddles 40 with the workpiece edge allows the user to slide the saw along the workpiece until the saw blade has been aligned with the desired cutline. Attempts to do this type of sliding alignment with the saw blade in contact with the workpiece likely would result in substantial damage to the workpiece.

This initial alignment discussed above is crucial for the remaining cutting of the workpiece. If the saw is not properly aligned at the very start, it may be very difficult for the user to correct the cutting alignment after the saw has entered the workpiece. Further, such corrections and improper alignment can result in undulations on the edge of the workpiece that has been cut.

In the above-described construction shown in FIGS. 1–6, it may be desirable to position torsion spring 62 such that it biases paddles 40 to their deployed positions instead of their undeployed positions. More specifically, in such an arrangement, there would be no need for having finger lever 44. The user would simply position paddles 40, which are held in their deployed position by the spring, against the edge of the workpiece in the same manner described above. The user could sense by the tension in the spring that both the paddles were in engagement with the workpiece edge. As the user moves the saw 40 to begin the cutting action, the paddles begin to move rearwardly in a counterclockwise direction against the force of the spring. Because the spring continues to force the paddles into engagement with the workpiece edge, the alignment of the saw continues to be sensed by the user and maintained throughout the initial cutting actions until the paddles reach their undeployed positions. In such an arrangement, after the saw has passed through the workpiece and is disengaged therefrom, the torsion spring pivots the paddles to their deployed positions so that they are ready for another cut.

Figure 7:
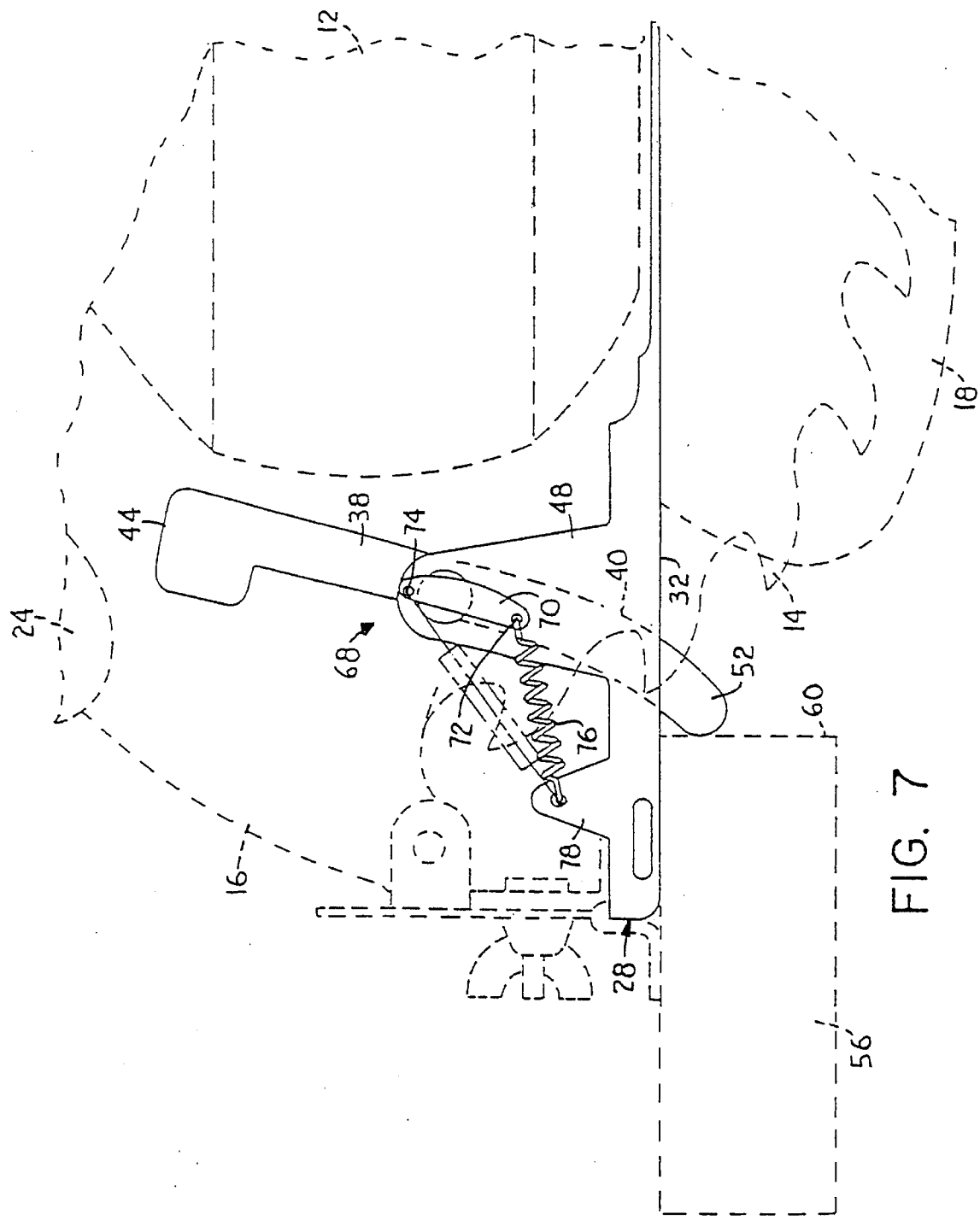
FIG. 7 is a side elevational view of an alternative aligning mechanism showing an alternative spring position in phantom lines, and the aligning mechanism in its deployed position.

With reference to FIG. 7, an alternative aligning mechanism 68 is shown. The same reference numerals used in FIGS. 1–6 are used to indicate like structures in FIG. 7. Mechanism 68 is substantially identical to mechanism 36 disclosed in FIGS. 1–6, except that mechanism 68 does not utilize a torsion spring 62 to bias the paddles to their desired positions. Instead, mechanism 68 has a lever 70 fixedly attached to the very end of one of pins 46. Lever 70 has a spring attachment hole 72 located on its very lower end and a spring attachment hole 74 located adjacent its upper end. One end of a coil spring 76 is attached to either hole 72 or hole 74, depending upon the desired biasing of the paddles, as will be more fully explained below. The other end of spring 76 is attached to a spring attaching post 78 extending upwardly from base 28. Post 78 has a hole for engagement with the end of the spring.

In FIG. 7, spring 76 is shown in solid lines positioned in lever hole 72 of lever 70. If spring 76 is positioned as such, paddles 40 will be biased toward their deployed positions, as depicted in FIG. 7. As discussed above, if paddles 40 are biased to their deployed position, a user can sense the engagement of the paddles with edge 60 of workpiece 56 so as to determine that the blade is properly aligned with respect to the workpiece edge. Further, as the saw passes into the workpiece, spring 76 will be further tensioned, thus allowing the user again to sense the engagement of the paddles with the edge of the workpiece to ensure proper alignment during the initial cutting stages. Once the saw is disengaged from the workpiece, paddles 40 will automatically rotate clockwise to their deployed positions due to the bias of spring 76.

Shown in phantom lines in FIG. 7 is the alternative position of spring 76. A saw user can change to this alternative position by simply disengaging spring 76 from hole 72 and thereafter engaging the end of spring 72 with hole 74. As is apparent, in this alternative spring position, paddles 40 will be biased to their undeployed positions. Therefore, as described above in detail, a user will have to actuate the paddles to their deployed positions utilizing finger lever 44 prior to aligning the saw with the workpiece. The embodiment shown in FIG. 7 allows the user versatility in determining which is the most desirable mode of operation for the mechanism.

Figure 8:
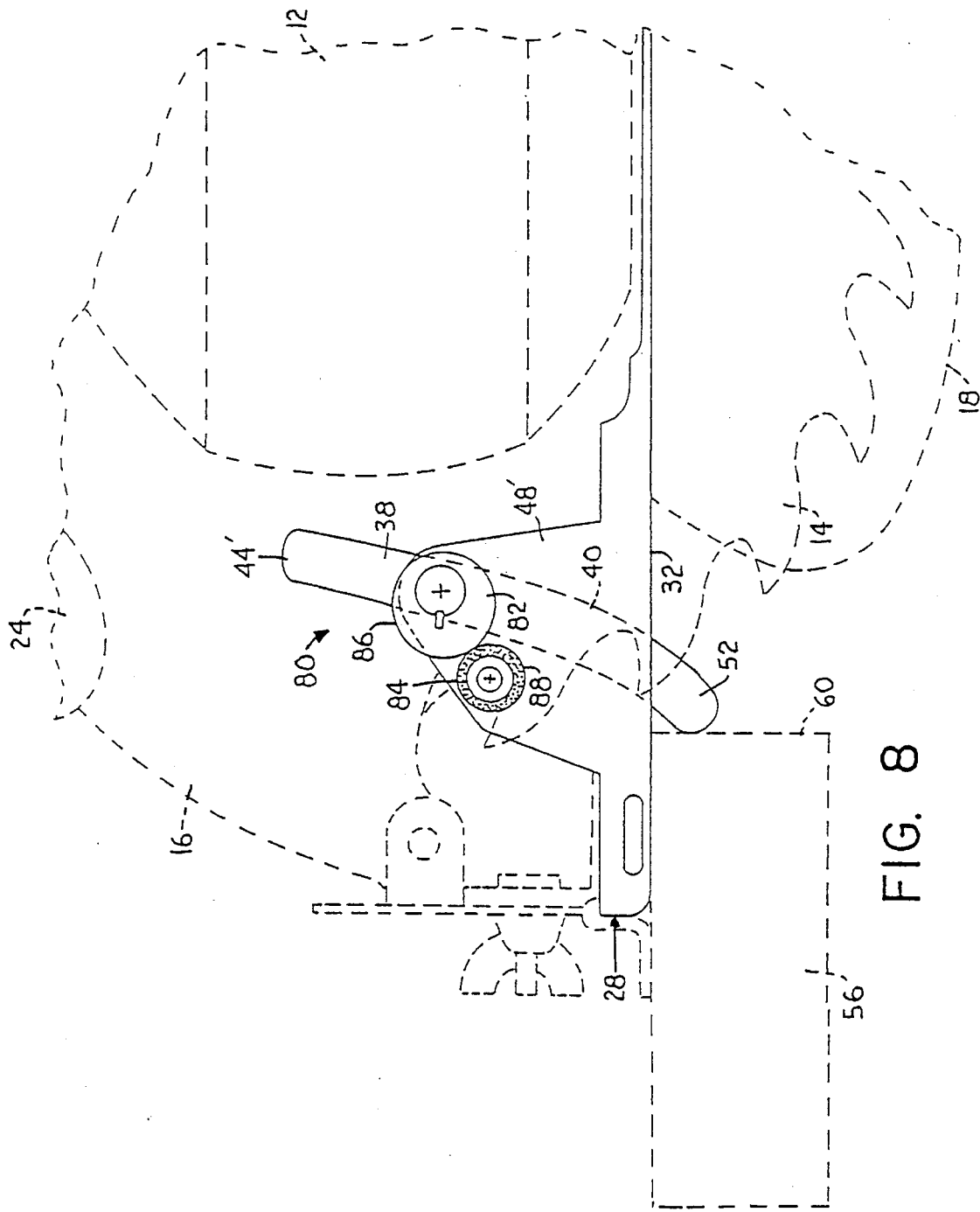
FIG. 8 is a side elevational view of a further alternative aligning mechanism, the mechanism shown in its deployed position.

With reference to FIG. 8, a further alternative aligning mechanism 80 is shown. The reference numerals used in FIGS. 1–6 to indicate structures are also used in FIG. 8 to designate the same or similar structures. Mechanism 80 is very similar to mechanism 36, except that mechanism 80 does not utilize a torsion spring 62. Instead, mechanism 80 utilizes a cam 82 fixedly positioned on the end of one of pins 46 and a resilient bumper 84 positioned on a modified mounting post 48'. Cam lobe surface 86 is in engagement with the outer peripheral surface 88 of bumper 84.

In FIG. 8, paddles 40 are shown in their deployed positions. Paddles 40 are generally held in their deployed positions by the engagement of lobe surface 86 with peripheral surface 88. More specifically, in this deployed position, resilient bumper 84 is compressed by lobe 86. This compression of the bumper holds paddles 40 in their deployed position. Therefore, a saw user can sense when both paddles 40 are in contact with the edge of the workpiece, due to the paddles being held in this deployed position by the compression of the bumper.

As the user further exerts forward pressure on the saw, paddles 40 will tend to rotate rearwardly in counterclockwise direction. As the paddles do this, bumper 84 will be further compressed, thus again resisting the rearward movement of the paddles and allowing the saw user to sense that the paddles are still engaging the edge of the workpiece.

After the paddles have rotated to a position where the center of cam surface 86 has passed beyond the engagement with bumper 84, the resistance to the rearward movement of the paddles will gradually decrease until the paddles reach their undeployed positions. In the undeployed positions of the paddles, bumper 84 will still be slightly compressed such that the paddles are held in this undeployed position.

After the saw has been disengaged from the workpiece, and the user wishes to make another cut with the aligning mechanism, the user actuates finger lever 44' to rotate paddles 40 in a clockwise direction to their deployed positions. As this is done, bumper 84 again becomes more compressed, such compression ensuring that paddles 40 are held in their deployed position.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

We claim:

1. A hand-held cutting device comprising:

a motor;

a cutting tool assembly coupled to said motor and including a cutting tool;

a base disposed below said cutting tool assembly and having an upper surface and a lower surface; and at least two paddles pivotally mounted about a horizontal axis and movable in unison between a deployed position and an undeployed position, each said paddle in its deployed position extending below said lower surface of said base and capable of contacting an edge of a workpiece to be cut by said cutting tool so that said cutting tool is aligned in a predetermined position with respect to the edge, said paddles moving in unison toward their undeployed position as said cutting tool engages the workpiece while maintaining the predetermined alignment of said cutting tool and the edge.

2. The hand-held cutting device of claim 1 wherein said cutting tool is a saw blade.

3. The hand-held cutting device 1 of claim 1 wherein said cutting tool is a circular saw blade.

4. An aligning mechanism for a hand-held circular saw having a motor and saw blade assembly, comprising:

a base adapted to be attached to the motor and saw blade assembly of the circular saw, said base having an upper surface and a lower surface;

at least two paddles pivotally mounted about a horizontal axis and movable in unison between a deployed position and an undeployed position, each said paddle in its deployed position extending below said lower surface of said base and capable of contacting an edge of a workpiece to be cut by said saw so that a saw blade of said saw is aligned in a predetermined position with respect to the edge, said paddles moving in unison towards their undeployed position as the saw blade engages the workpiece while maintaining the predetermined alignment between the saw blade and the edge.

5. The mechanism of claim 4 further comprising means for biasing said paddles toward their undeployed position.

6. The mechanism of claim 5 wherein said biasing means is a torsion spring.

7. The mechanism of claim 6 further comprising a finger lever attached to said paddles, said lever actuated by the fingers of a saw user to move said paddles against the force of said spring to their deployed position.

8. The mechanism of claim 5 wherein said biasing means includes an elongated lever attached to one of said paddles, said means also including a spring attached on one end to said lever and on the other end to said base.

9. The mechanism of claim 8 wherein said lever has two attachment points for said spring, when said spring is attached to one of said attachment points said paddles are biased towards their undeployed position and when said spring is attached to the other of said attachment points said paddles are biased towards their deployed position.

10. The mechanism of claim 4 further comprising means for resisting the movement of said paddles from their deployed position to their undeployed position.

11. The mechanism of claim 10 wherein said resisting means is a torsion spring.

12. The mechanism of claim 10 wherein said resisting means includes a cam disposed on one of said paddles and a resilient bumper attached to said base, said cam and bumper contacting one another so that said bumper is compressed as the paddles move toward their undeployed position.

13. The mechanism of claim 10 wherein said resisting means includes an elongated lever attached to one of said paddles, said resisting means also including a spring attached on one end to said lever and on the other end to said base.

14. The mechanism of claim 13 wherein said lever has two attachment points for said spring, when said spring is attached to one of said attachment points said paddles are biased towards their undeployed positions and when said spring is attached to the other of said attachment points said paddles are biased towards their deployed position.

15. The mechanism of claim 4 further comprising a generally horizontally disposed axle member extending between and connecting said paddles.

16. The mechanism of claim 16 wherein said axle member is pivotally mounted between a pair of posts extending upwardly from said upper surface of said base.

17. The mechanism of claim 4 wherein said paddles are pivotally mounted to the upper surface of said base.

18. The mechanism of claim 17 wherein said paddles are pivotally mounted on posts extending upwardly from said upper surface.

19. The mechanism of claim 4 further comprising a finger lever attached to said paddles, said lever actuated by the fingers of a saw user to move said paddles to their deployed position.

20. The mechanism of claim 4 wherein said base includes at least two elongated slots extending between said upper and said lower surfaces, each of said paddles extending through one of said slots when it is in its deployed position.

21. The mechanism of claim 4 wherein said horizontal axis is substantially perpendicular to the cutting path of the saw blade.

22. An aligning mechanism for a hand-held circular saw having a motor and saw blade assembly, comprising:
   a base adapted to be attached to the motor and saw blade assembly of the circular saw, said base having an upper surface and a lower surface;
   a U-shaped alignment member pivotally mounted above the upper surface of said base along an axis that is substantially perpendicular to the cutting path of a saw blade of said saw and having at least two downwardly extending paddles, said paddles movable between a deployed position and an undeployed position, each said paddle in its deployed position extending below said lower surface of said base and capable of contacting an edge of a workpiece to be cut by the saw so that the saw blade is aligned substantially perpendicular with the edge, said paddles moving towards their undeployed position as the saw blade engages the workpiece while maintaining the substantially perpendicular alignment between the edge and the saw blade.

23. The mechanism of claim 22 further comprising means for biasing said paddles toward their undeployed position.

24. The mechanism of claim 23 wherein said biasing means is a torsion spring.

25. The mechanism of claim 24 further comprising a finger lever attached to said alignment member, said lever actuated by the fingers of a saw user to move said paddles against the force of said spring to their deployed position.

26. The mechanism of claim 23 wherein said biasing means includes an elongated lever attached to one of said paddles, said means also including a spring attached on one end to said lever and on the other end to said base.

27. The mechanism of claim 26 wherein said lever has two attachment points for said spring, when said spring is attached to one of said attachment points said paddles are biased towards their undeployed position and when said spring is attached to the other of said attachment points said paddles are biased towards their deployed position.

28. The mechanism of claim 22 further comprising means for resisting the movement of said paddles from their deployed position to their undeployed position.

29. The mechanism of claim 28 wherein said resisting means is a torsion spring.

30. The mechanism of claim 28 wherein said resisting means includes a cam disposed on one of said paddles and a resilient bumper attached to said base, said cam and bumper contacting one another so that said bumper is compressed as the paddles move toward their undeployed position.

31. The mechanism of claim 28 wherein said resisting means includes an elongated lever attached to one of said paddles, said means also including a spring attached on one end to said lever and on the other end to said base.

32. The mechanism of claim 31 wherein said lever has two attachment points for said spring, when said spring is attached to one of said attachment points said paddles are biased towards their undeployed positions and when said spring is attached to the other of said attachment points said paddles are biased towards their deployed position.

33. The mechanism of claim 22 wherein said alignment member is pivotally mounted to the upper surface of said base.

34. The mechanism of claim 33 wherein said alignment member is pivotally mounted between posts extending upwardly from said upper surface.

35. The mechanism of claim 22 further comprising a finger lever attached to said alignment member, said lever actuated by the fingers of a saw user to move said paddles to their deployed position.

36. The mechanism of claim 22 wherein said base includes at least two elongated slots extending between said upper and said lower surfaces, each said paddle extending through one of said slots when it is in its deployed position.

* * * * *